United States Patent
Lobo et al.

(10) Patent No.: US 12,363,040 B2
(45) Date of Patent: Jul. 15, 2025

(54) METHOD AND SYSTEM FOR DYNAMIC LOAD BALANCING

(71) Applicant: NetScout Systems Texas, LLC, Plano, TX (US)

(72) Inventors: Danny Lobo, San Jose, CA (US); Clifford Lin, South San Francisco, CA (US); Kaushik Koneru, Milpitas, CA (US); Russell Erikson, Portola Valley, CA (US)

(73) Assignee: NetScout Systems Texas, LLC, Westford, MA (US)

( * ) Notice: Subject to any disclaimer, the term of this patent is extended or adjusted under 35 U.S.C. 154(b) by 625 days.

(21) Appl. No.: 17/582,654

(22) Filed: Jan. 24, 2022

(65) Prior Publication Data
US 2023/0239247 A1 Jul. 27, 2023

(51) Int. Cl.
*H04L 47/125* (2022.01)
*H04L 41/0813* (2022.01)
(Continued)

(52) U.S. Cl.
CPC ........ *H04L 47/125* (2013.01); *H04L 41/0813* (2013.01); *H04L 41/0823* (2013.01);
(Continued)

(58) Field of Classification Search
CPC ............... H04L 47/125; H04L 47/2483; H04L 41/0813; H04L 41/0823; H04L 43/04; H04L 43/0829; H04L 43/0882
See application file for complete search history.

(56) References Cited

U.S. PATENT DOCUMENTS

| 10,320,691 B1* | 6/2019 | Matthews | H04L 45/24 |
| 2009/0109845 A1* | 4/2009 | Andreasen | H04L 41/0893 |
| | | | 370/230 |

(Continued)

FOREIGN PATENT DOCUMENTS

| WO | WO-2013055812 A1 * | 4/2013 | G06F 9/45558 |
| WO | WO-2013070631 A1 * | 5/2013 | H04L 43/16 |

(Continued)

OTHER PUBLICATIONS

Standard Data Transfer Format Between Data Preparation System and Programmable Logic Device Programmer, JEDEC Standard JESD3-C, Electronics Industries Association, Jun. 1994 (Year: 1994).*

(Continued)

*Primary Examiner* — Emmanuel L Moise
*Assistant Examiner* — Robert A Shaw
(74) *Attorney, Agent, or Firm* — Foley & Lardner LLP (57) ABSTRACT

A system and method for performing dynamic load balancing in a network load balancer device. A network packet flow is monitored in a load balancer device for detecting dropped network packets, or a sampling of traffic flow, in the monitored network packet flow. Metadata (e.g., a 5-tuple) is created for the detected dropped network packets or sampling of network traffic flow. The metadata is then transmitted to a flow processing analysis device for performing load balancing flow processing. Upon analysis, a determination is made in the flow processing analysis device for determining reconfiguration load balancing settings for the load balancer to mitigate occurrence of unintended dropping of network packets in the load balancer and/or improve its overall performance. The reconfiguration load balancing settings are then transmitted to the load balancer device, whereupon (Continued)

receipt the load balancer changes its settings in accordance with the determined reconfiguration settings.

18 Claims, 3 Drawing Sheets

(51) Int. Cl.
    *H04L 41/0823*     (2022.01)
    *H04L 43/04*     (2022.01)
    *H04L 43/0829*     (2022.01)
    *H04L 43/0882*     (2022.01)
    *H04L 47/2483*     (2022.01)

(52) U.S. Cl.
    CPC .......... *H04L 43/04* (2013.01); *H04L 43/0829* (2013.01); *H04L 43/0882* (2013.01); *H04L 47/2483* (2013.01)

(56) References Cited

U.S. PATENT DOCUMENTS

| | | | |
|---|---|---|---|
| 2013/0343390 A1* | 12/2013 | Moriarty | H04L 43/0852 370/392 |
| 2013/0347103 A1* | 12/2013 | Veteikis | H04L 43/04 726/22 |
| 2014/0321278 A1* | 10/2014 | Cafarelli | H04L 43/12 370/235 |
| 2015/0085694 A1* | 3/2015 | Agarwal | H04L 43/022 370/253 |
| 2015/0149611 A1* | 5/2015 | Lissack | H04L 41/12 709/224 |
| 2016/0065423 A1* | 3/2016 | Zhang | H04L 47/125 370/235 |
| 2016/0226826 A1* | 8/2016 | Pan | H04L 63/1441 |
| 2016/0323166 A1* | 11/2016 | Pandey | H04L 43/0852 |
| 2016/0330111 A1* | 11/2016 | Manghirmalani | H04L 69/22 |
| 2016/0359740 A1* | 12/2016 | Parandehgheibi | H04L 63/1408 |
| 2017/0222881 A1* | 8/2017 | Holbrook | H04L 43/0876 |
| 2017/0346709 A1* | 11/2017 | Menon | H04L 45/70 |
| 2017/0373953 A1* | 12/2017 | George | H04L 43/04 |
| 2018/0062962 A1* | 3/2018 | Pignataro | H04L 43/026 |
| 2019/0028384 A1* | 1/2019 | Penno | H04L 45/306 |
| 2019/0166020 A1* | 5/2019 | Mommileti | H04L 43/12 |
| 2019/0173736 A1* | 6/2019 | Ponnuswamy | H04L 41/145 |
| 2019/0238633 A1* | 8/2019 | Rao | H04L 67/1025 |
| 2019/0297118 A1* | 9/2019 | Haugsnes | H04L 63/1441 |
| 2019/0372873 A1* | 12/2019 | Beeram | H04L 47/32 |
| 2020/0007583 A1* | 1/2020 | Dixit | H04L 63/102 |
| 2020/0153739 A1* | 5/2020 | Gafni | H04L 47/41 |
| 2020/0162315 A1* | 5/2020 | Siddiqi | H04L 41/22 |
| 2020/0249874 A1* | 8/2020 | Foo | G06F 16/182 |
| 2020/0280499 A1* | 9/2020 | Patil | H04L 43/026 |
| 2020/0287996 A1* | 9/2020 | Vann | H04L 47/32 |
| 2020/0296007 A1* | 9/2020 | Finn, II | H04L 41/145 |
| 2021/0243132 A1* | 8/2021 | Gilman | H04L 43/08 |
| 2021/0328929 A1* | 10/2021 | Kleiman | H04L 47/21 |
| 2021/0328939 A1* | 10/2021 | Munukutla | H04L 45/28 |
| 2021/0368029 A1* | 11/2021 | Zhang | H04L 47/196 |
| 2022/0070279 A1* | 3/2022 | Pang | H04L 67/133 |
| 2022/0210066 A1* | 6/2022 | Khanna | H04L 45/74 |
| 2023/0032441 A1* | 2/2023 | Singh | H04L 45/74 |
| 2023/0087454 A1* | 3/2023 | Cheng | H04L 47/2483 709/224 |
| 2023/0096394 A1* | 3/2023 | Prabhu Muraleedhara Prabhu | H04L 41/0894 370/389 |
| 2023/0108819 A1* | 4/2023 | Aghajanyan | G06Q 10/06393 705/7.39 |
| 2023/0208769 A1* | 6/2023 | Iyer | H04L 45/64 370/230 |

FOREIGN PATENT DOCUMENTS

| | | | | |
|---|---|---|---|---|
| WO | WO-2015066728 A1 * | 5/2015 | ......... | G06F 9/45533 |
| WO | WO-2021107867 A1 * | 6/2021 | | |
| WO | WO-2021247898 A1 * | 12/2021 | ............. | G06N 20/00 |

OTHER PUBLICATIONS

IETF RFC 6759, Cisco Systems Export of Application Information in IP Flow Information Export (IPFIX), Cisco Systems Inc., Nov. 2012 (Year: 2012).*

P4 Telemetry Report Format Specification Version 2.0, The P4.org Applications Working Group, Oct. 8, 2020 (Year: 2020).*

In-band Network Telemetry (INT) Dataplane Specification, Version 2.1, The P4.org Applications Working Group, Nov. 11, 2020 (Year: 2020).*

\* cited by examiner

METHOD AND SYSTEM FOR DYNAMIC LOAD BALANCING

BACKGROUND

1. Field

The disclosed embodiments generally relate to data communication in a network, and more specifically to dynamic load balancing of packets in a network.

2. Description of Related Art

In networking, load balancers are traditionally used to distribute network and application traffic across a number of servers. Load balancing is generally a method of distributing workload across a series of devices (for example, servers) in order to increase productivity. For example, multiple servers can be used to provide services for client nodes, such as computers, mobile phones, etc., in a network. Flow-based load-balancing involves classifying data communication traffic into flows based on characteristics of data packets. As data packets (for example, Internet Protocol (IP) data packets) arrive at a load-balancing device (or "load-balancer"), the load-balancer examines these data packets to determine the relevant characteristics that these data packets possess. The load-balancer may be configured with a set of stored criteria against which the load-balancer compares the characteristics of each data packet. The set of stored criteria defines one or more flows; each flow is associated with one or more criteria. Upon determining that a received data packet's characteristics satisfy a particular flow's defined criteria, the load-balancer assigns that data packet to the particular flow. The load-balancer also may be configured with a set of stored rules. Each flow may be associated with one or more rules. After determining that a data packet belongs to a particular flow, the load-balancer may apply the rules to the data packet in order to handle the data packet in a specified manner. Thus, the load-balancer may handle all data packets that belong to a particular flow according to that flow's set of rules, but the load-balancer may handle data packets that belong to different flows differently if those flows' rules differ. A flow's rules may indicate, among other actions, that the load-balancer should route all data packets that belong to the flow to a particular server.

For example, in order to determine the flow to which an incoming data packet belongs, the load-balancer may examine the data packet's "quintuple" (or "5-tuple"). This quintuple typically consists of (a) the data packet's source IP address, (b) the data packet's destination IP address, (c) the data packet's source Transmission Control Protocol (TCP) or User Datagram Protocol (UDP) port, (d) the data packet's destination TCP or UDP port, and (e) the data packet's transport layer protocol identifier (e.g., TCP or UDP). The load-balancer typically obtains this information by examining the data packet's headers (e.g., the IP header, the TCP header, and/or the UDP header). Each header is of an expected length and offset, and therefore the load-balancer knows at which bits of the data packet to look in order to obtain the quintuple information.

After obtaining the data packet's quintuple, the load-balancer determines which, if any, of the flows' criteria are satisfied by the information in the quintuple. For example, a flow might be associated with criteria that specify a range of source IP addresses and destination IP addresses in order to shape all traffic that passes from one specified set of devices to another specified set of devices. For another example, a flow might be associated with criteria that specify a particular TCP destination port in order to shape all traffic that is likely to be associated with a particular application or purpose. Flows may be prioritized relative to each other so that a data packet will always be assigned to the highest-priority flow even if the data packet's quintuple satisfies more than one flow's criteria. Upon determining a flow whose criteria the data packet's quintuple satisfies, the load-balancer assigns the data packet to that flow and applies, to the data packet, the rules that are associated with that flow.

For example, the flow to which a data packet is assigned might be associated with rules that state that the data packet is to be encrypted and routed to a particular server-even if that server is not actually associated with the data packet's destination IP address. For another example, the rules associated with the data packet's assigned flow might state that data packet is to be dropped, and not forwarded at all. The load-balancer handles each data packet according to the rules that are associated with that data packet's assigned flow. To help ensure that no single server of a set of servers becomes overwhelmed with data traffic while other servers in the set sit relative idle, the load-balancer's rules may be configured to route different flows' data packets to different servers in the server set in a manner that is as equitable as possible. Thus, the load-balancing is "flow-based."

One limitation of flow-based load-balancing arises from the fact that flow-based load-balancing often leads to load imbalance or overflow (drop) due to the dynamic nature of network traffic and the nature of hashing flows the data packet's "quintuple" (or "5-tuple"). Currently, when traffic drops there is no mechanism to analyze why such load imbalance or overflow (packet dropping) is occurring nor is there any mechanism to automatically reconfigure the load balancing configuration of the load balancer to improve performance.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method for performing dynamic load balancing in a network load balancer device is described in which a network packet flow is monitored in a load balancer device for detecting dropped network packets, or a sampling of traffic flow, in the monitored network packet flow. Metadata (e.g., a 5-tuple) is created for the detected dropped network packets or sampling of network traffic flow. The metadata is then transmitted to a flow processing analysis device for performing load balancing flow processing. Upon analysis, a determination is made in the flow processing analysis device for determining reconfiguration load balancing settings for the load balancer to mitigate occurrence of unintended dropping of network packets in the load balancer and/or improve its overall performance. The reconfiguration load balancing settings are then transmitted to the load balancer device, whereupon receipt the load balancer changes its settings in accordance with the determined reconfiguration settings.

BRIEF DESCRIPTION OF THE DRAWINGS

So that those skilled in the art to which the subject disclosure appertains will readily understand how to snake and use the devices and methods of the subject disclosure without undue experimentation, preferred illustrated embodiments thereof will be described in detail herein below with reference to certain figures, wherein.

DETAILED DESCRIPTION OF CERTAIN EMBODIMENTS

Aspects of the disclosed embodiments are shown in the following description and related drawings directed to specific illustrated embodiments. Alternate preferred embodiment's may be devised without departing from the scope of the illustrated embodiments. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

The terminology used herein is for the purpose of describing particular embodiments only and is not intended to be limiting of the illustrated embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device/system. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either or both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
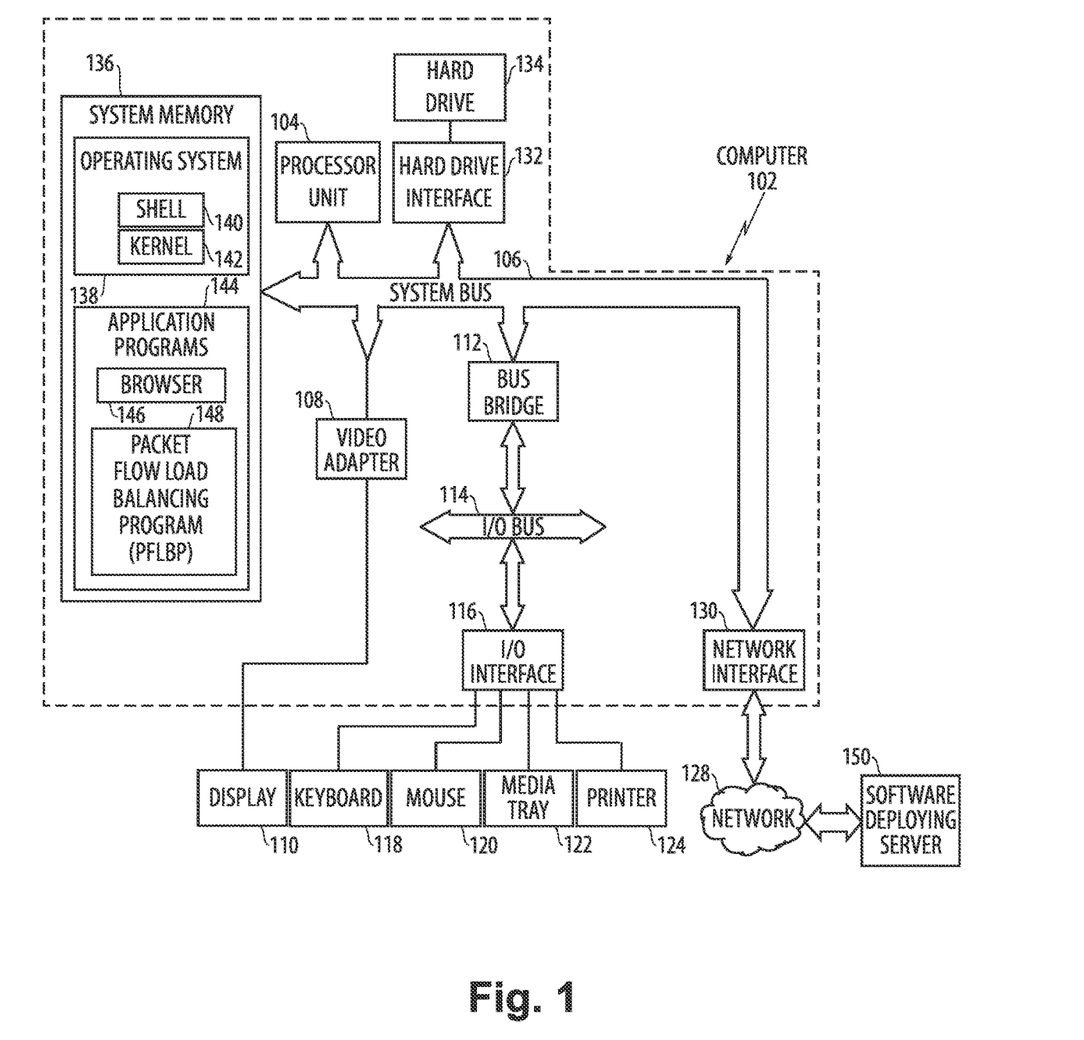
FIG. 1 illustrates an exemplary computer network device/node suitable for use with the certain illustrated embodiments.

With reference now to the figures, and in particular to FIG. 1, there is depicted a block diagram of an exemplary computer 102, which may be utilized by the present disclosure. Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and a printer 124. While the format of the ports connected to I/O interface 116 may be any known to those skilled in the art of computer architecture, in a preferred embodiment some or all of these ports are universal serial bus (USB) ports.

As depicted, in one embodiment, computer 102 is optionally able to communicate via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Figure 3:
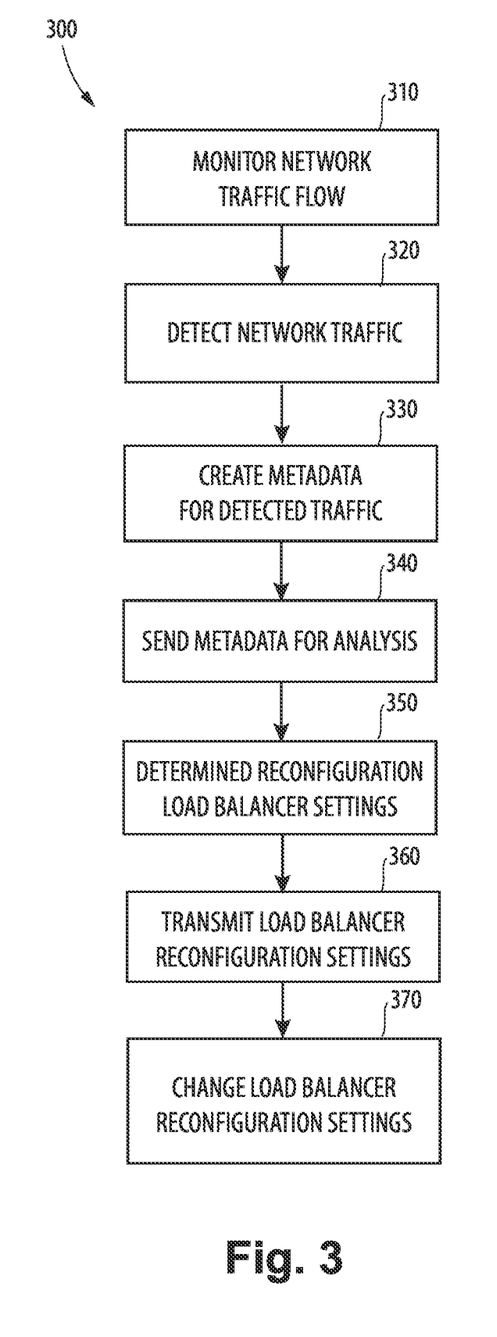
FIG. 3 illustrate a flow chart depicting use of the load balancer and packet flow analysis device of FIG. 2 in accordance with the illustrated embodiments described herein.

Application programs 144 also include an IP packet flow load balancing program (PFLBP) 148, which, when executed, performs some or all of the processes described in FIG. 3. In one embodiment, PFLBP 148 is downloadable from software deploying server 150 in an on-demand basis, such that units of code are downloaded only when needed. In another embodiment, some or all of the processes executed by PFLBP 148 are performed by software deploying server 150 itself, thus minimizing the use of resources within computer 102.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

FIG. 1 is intended to provide a brief, general description of an illustrative and/or suitable exemplary environment in which embodiments of the below described certain illustrated may be implemented. FIG. 1 is exemplary of a suitable environment and is not intended to suggest any limitation as to the structure, scope of use, or functionality of an embodiment of the illustrated embodiments. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 2:
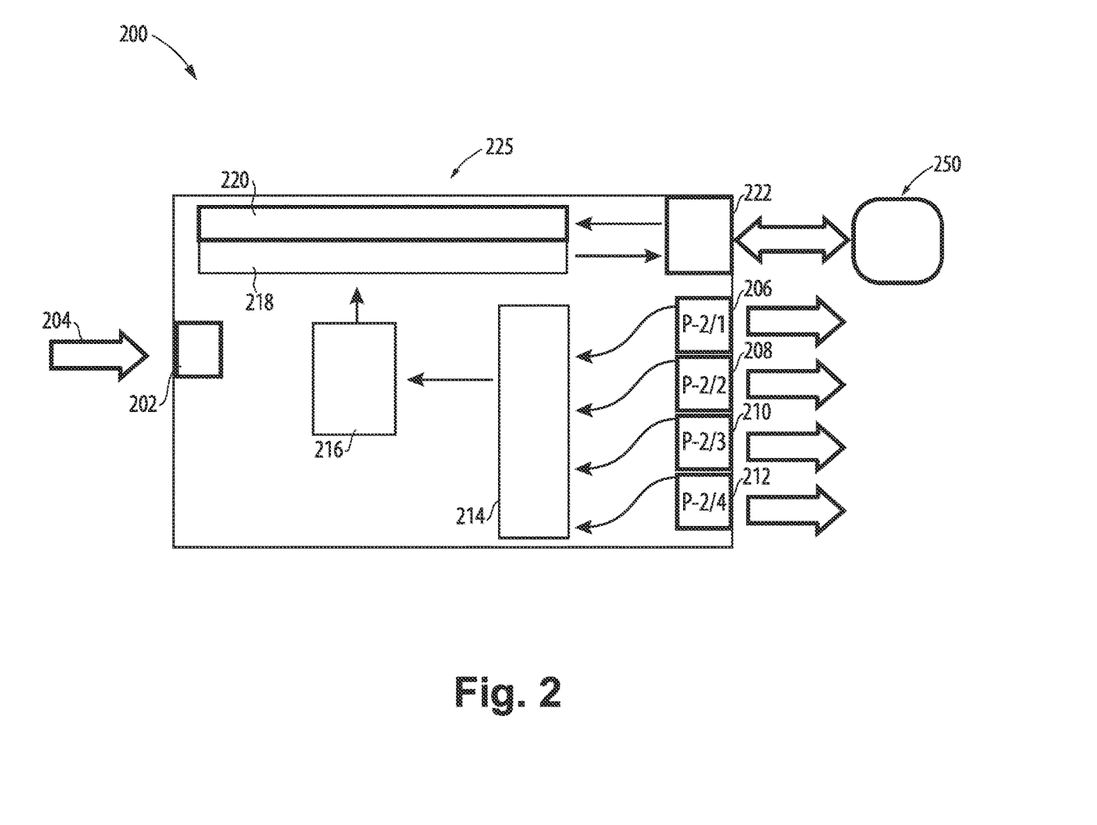
FIG. 2 illustrates an exemplary load balancer and packet flow analysis device in accordance with the illustrated embodiments.

With the exemplary computing device 102 being generally shown and discussed above with reference to FIG. 1, description of certain illustrated embodiments will now be provided. With reference now to FIG. 2, shown is a load balancing system (designated generally be reference numeral 200) preferably including packet flow load balancer device (generally referenced by numeral 225) operatively coupled to an analytical network packet monitoring device (generally referenced by numeral 250).

With regards to load balancer device 225, it may consist of the nGenius® Packet Flow Operating System (PFOS) commercially available from NETSCOUT Systems, Inc. Current functionality of such a PFOS 225 includes core packet broker functionality, such as filtering, load balancing, aggregation and replication. PFOS 225 is understood to be enabled with self-organizing mesh technology and is scalable for various network monitoring needs. Inline tool chaining allows aggregation, filtering, and load-balancing of network traffic toward multiple inline security applications while maintaining only a single intrusion (e.g., port 202) into each network link for receiving a packet traffic flow 204 therefrom.

And with regards to the analytical network packet monitoring device 250, it may consist of the InfiniStreamNG® (ISNG) software and hardware appliance module products also commercially available from NETSCOUT Systems, Inc. ISNG module 250 is to be understood to be operable and configured to perform analytics on packet metadata received from PFOS 225 to preferably determine and provide reconfiguration load balancing settings for the PFOS 225 in accordance with the below illustrated exemplary embodiments, in addition to its other know functionality attributable to such an ISNG 250 (e.g., providing reports on key performance indicators, network and application error details and other specialized services).

In accordance with the illustrated embodiments, described herein is a packet flow load balancing system 200 configured and operable to have a datapath anomalies driven configuration for improving, and providing improved visibility, for packet load balancing and real-time monitoring of packets dropped in a load balancing device (e.g., PFOS 225). Additionally provided by system 200 is continuous monitoring of a user configuration of output threshold rate for detecting dropped packet conditions, or almost dropped (e.g., user configure threshold limit), for enabling a faster recovery time. Functionality of system 200 includes (and is not to be understood to be limited to) monitoring imbalance behavior or any traffic dropped at transmit ports (e.g., 206-212) of the PFOS 225 for creating metadata of the dropped traffic (e.g., 5-tuple—source/destination IP, source/destination port, protocol) for dropped packets preferably periodically sampled in a Drop Flow Generator and Flow Sampling module 214 provided in the PFOS 225. Additional functionality includes writing the aforesaid packet flow metadata (5-tuple) to a Transmit Capture Buffer (TCB) 216, also preferably provided in the PFOS 225. In accordance with an exemplary illustrated embodiment, the size of TCB 216 may be the minimum of 512 entries. It is to be understood and appreciated the aforesaid generated packet metadata (e.g., 5-tuples) may be for dropped packets at the transmit ports (206-212), as well as a sampling of all packet flows through the PFOS 225 transmit ports (206-212) for monitoring a certain network in the scenario the ISNG module 250 requires more than drop packet flows to determine an optimal load balancing configuration for the PFOS 225.

With continuing reference to the PFOS 225, and in accordance with the illustrated embodiments, it is further preferably configured and operable to generate the aforesaid metadata 5-tuples into a Standard Data Transfer Format (SDTF) in band message, via a SDTF Message Generator module 218 provided in the PFOS 225. In accordance with the exemplary illustrated embodiments, the SDTF in-band message generator 218 preferably transmits Ethernet packets through the management ports 222 of the PFOS 225 (or any other forwarded ports of the PFOS 225) to the ISNG 250. The SDTF Message Generator module 218 is further configured and operable to transmit the aforesaid SDTF message of the packet metadata (5-tuples) to the ISGN module 250 for analysis and load balancing flow processing in accordance with the described illustrated embodiments.

For instance, the ISNG module 250 is configured and operable to analyze the aforesaid SDTF in-band message having the packet metadata (5-tuples) to determine load balance reconfiguration settings for the PFOS 225 to mitigate occurrence of unintended dropping of packets in the PFOS 225 as well as improve its overall performance. The ISNG module 250 then sends a SDTF feedback configuration changed in-band message back to the PFOS 225 to accordingly change the load balancing configuration 220 of the PFOS 225. It is to be appreciated and understood the ISNG 250 may either perform analysis for the reason why packets are dropped, and/or may collect drop packets information to compile a histogram of packet flow in PFOS 225 for enabling machine learning AI techniques for determining/providing the load balancing reconfiguration settings (220) for the PFOS 225.

It is to be further appreciated and understood the load balancing types supported by the PFOS 225 include (and are not to be understood to be limited to): 5-Tuple (Source IP, Destination IP, L4 Source Port, L4 Destination Port, and Protocol); Source IP and L4 Source Port; Destination IP and L4 Destination Port; Source IP and Destination IP; Source IP only; and Destination IP only. Thus, the ISNG 250 is operable and configured to change any one of these aforesaid support load balancing mechanisms to mitigate packet dropping in the PFOS 225 upon analysis of the aforesaid received packet metadata from the PFOS 225. In particular, the ISNG Flow Processing Module (FPM) 250 upon receipt of packet metadata (e.g., drop flow traffic and/or sampling flow traffic) from the PFOS 225, is preferably configured and operable to process all possible load balancing types (5-tuple, Source IP only, or Destination IP only and so on) with different supported hash algorithms in parallel for determining load balancing mechanisms and hash algorithms enabling optimal load balancing performance for the PFOS 225. It is to be appreciated and understood, and as mentioned above, the ISNG FPM 250 is configured and operable to utilize machine learning techniques on the aforesaid metadata received from the PFOS 225 whereby the ISNG FPM 250 preferably maintains the output load balancing results with a histogram for deep learning analysis (e.g., Artificial Intelligence (AI)) for enabling improved analysis/decision making for providing optimal load balance reconfiguration settings 220 feedback to the PFOS 225.

With the certain exemplary illustrated embodiment of FIG. 2 described above, with reference now to FIG. 3 (and with continuing reference to FIG. 2) shown is flowchart depicting certain operational steps performed by the system 200 in accordance with illustrative embodiments. Before turning to the descriptions of FIG. 3, it is noted that the flow diagram shown therein is described, by way of example, with reference to components shown in FIG. 2, although these operational steps may be carried out in any system and are not limited to the scenario shown in the aforementioned figures. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

With reference now to FIG. 3, shown is an exemplary process 300 for performing dynamic load balancing in a network load balancing device 225 (e.g., a PFOS load balancer device, as mentioned above). Starting at step 310, network traffic packet flows are monitored preferably at the transmit ports 206-212 of the network load balancer device 225. In accordance with the illustrated embodiments, load balancing groups are prescribed for the transmit ports 206-

212 of the load balancer device 225 for monitoring the traffic packet flows. Next, at step 320, dropped network packets, from the monitored traffic packet flows (step 310) are detected, preferably in a drop flow generator and flow sampling module 214 of the load balancer device 225. In accordance with the illustrated embodiments, a sampling frequency is preferably prescribed at the transmit ports 206-212 for detecting dropped network packets. For instance, an exemplary sampling frequency is 156.25 MHz or 312.5 MHz.

Next, at step 330, the load balancer 225 is configured and operable, preferably in the drop flow generator and flow sampling module 214, to generate metadata for the detected dropped packets (step 320). It is to be appreciated and understood, the generated metadata may consist of a 5-tuple consisting of Source IP, Destination IP, L4 Source Port, L4 Destination Port, and a Protocol for the detected dropped packets. The load balancer 225 may further create a hash value for the 5-tuple, which is created for instance by using a CRC32 or CRC16 hash algorithm. It is to be further appreciated and understood, the load balancer 225 may support metadata also consisting of: Source IP and L4 Source Port; Destination IP and L4 Destination Port; Source IP and Destination IP; Source IP only; and Destination IP only. The drop flow generator and flow sampling module 214 is further preferably configured and operable to write the aforesaid generated metadata for the detected dropped packets into a Transmit Capture Buffer module 216 of the load balancer 225. For instance, the size of the TCB 216 may be a minimum of 512 entries.

At 340, the aforesaid metadata for the dropped packets (e.g., a 5-tuple) is transmitted from the load balancer 220 to a flow processing analysis device 250 (e.g., an ISNG device, as mentioned above) for performing load balancing analysis based upon the detected dropped packets (step 320). It is to be appreciated and understood, the load balancer device 225, via a Standard Data Transfer Format (SDTF) message generator module 218, may generate the metadata into a SDTF in-band message to be transmitted to the flow processing analysis device 250. And in accordance with the illustrated embodiments, alternative to sending metadata of detected dropped network traffic, a sample of monitored network packet traffic flowing through the transmit ports 206-212 of the load balancer 225 may be sent to the flow processing analysis device 250 for performing the load balancing analysis.

Next, at step 350, the flow processing analysis device 250 (as mentioned above) determines reconfiguration load balancing settings for the load balancer 225 based upon analysis of the received metadata (e.g., detected dropped packets or a sampling of packet flows) to mitigate occurrence of unintended dropping of network packets and/or improve the performance of the load balancer 225. As also mentioned above, the flow processing analysis device 250 preferably maintains a histogram of previous load balancing results for determining the aforesaid load balance reconfiguration settings for the load balancer 225 so as to perform machine learning techniques (AI) utilizing the histogram of previous output load balancing results for determining the reconfiguration load balancing settings for the load balancing device 225.

Once the reconfiguration settings for the load balancer 225 are determined (step 350), next at step 360, the determined reconfiguration settings are transmitted to the load balancer 225. In accordance with the illustrated embodiments, the aforesaid reconfigurations setting are preferably generated in a SDTF in-band message so as to be preferably received by a load balancing configuration module 220 of the load balancer 225 as a SDTF message. Once received, the load balancer 225 changes its load balancing settings in accordance with the reconfigurations settings provided in the SDTF message transmitted from the flow processing analysis device 250, step 370.

With certain illustrated embodiments of the enterprise services platform described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for performing dynamic load balancing in a load balancing device, comprising:
   monitoring, by the load balancing device, network packet flow in transmit ports of the load balancing device, the load balancing device configured to control distribution of the network packet flow in accordance with a plurality of rules;
   detecting, by the load balancing device, unintended dropped network packets in the network packet flow;
   creating, by the load balancing device, metadata for the unintended dropped network packets;
   transmitting, by the load balancing device, the metadata to a flow processing analysis device for performing load balancing flow processing;
   determining, by the flow processing analysis device, reconfiguration load balancing settings for the load balancing device based on an analysis of the metadata;
   adjusting, by the flow processing analysis device, one or more rules of the plurality of rules that caused the unintended dropped network packets based on the reconfiguration load balancing settings for the load balancing device;
   transmitting, by the flow processing analysis device, the one or more adjusted rules and the reconfiguration load balancing settings to the load balancing device for subsequent implementation by the load balancing device while processing second network packet flow; and
   changing, by the load balancing device, one or more load balancing settings pursuant to the reconfiguration load balancing settings.

2. The method as recited in claim 1, further comprising:
   prescribing, by the load balancing device, load balancing groups for the transmit ports of the load balancing device for monitoring the network packet flow.

3. The method as recited in claim 1, further comprising:
   prescribing, by the load balancing device, a sampling frequency of packet flows at the transmit ports of the load balancing device for detecting the unintended dropped network packets in the network packet flow.

4. The method as recited in claim 1, further comprising:
transmitting, by the load balancing device, a sample of the network packet flow to the flow processing analysis device for performing the load balancing flow processing.

5. The method as recited in claim 1, wherein the flow processing analysis device maintains a histogram of previous output load balancing results for the load balancing device.

6. The method as recited in claim 5, wherein the flow processing analysis device performs machine learning techniques utilizing the histogram for determining the reconfiguration load balancing settings for the load balancing device.

7. The method as recited in claim 1, wherein the metadata is a 5-tuple.

8. The method as recited in claim 7, wherein the 5-tuple consists of Source Internet Protocol (IP), Destination IP, L4 Source Port, L4 Destination Port, and a Protocol.

9. The method as recited in claim 1, wherein the metadata consists of Source Internet Protocol (IP).

10. The method as recited in claim 7, wherein the load balancing device creates a hash value for the 5-tuple.

11. The method as recited in claim 10, wherein the hash value is created using a CRC32 hash algorithm.

12. The method as recited in claim 10, wherein the hash value is created using a CRC16 hash algorithm.

13. The method as recited in claim 1, further comprising:
writing, by the load balancing device, the metadata into a Transmit Capture Buffer (TCB).

14. The method as recited in claim 13, wherein a size of the TCB is at least 512 entries.

15. The method as recited in claim 1, further comprising:
generating, by the load balancing device, a Standard Data Transfer Format (SDTF) for the metadata, wherein the metadata is transmitted to the flow processing analysis device in the SDTF.

16. The method as recited in claim 15, further comprising:
generating, by the flow processing analysis device, a second SDTF for the reconfiguration load balancing settings wherein the reconfiguration load balancing settings are transmitted to the load balancing device in the second SDTF.

17. A method for performing dynamic load balancing in a load balancing device, comprising:
monitoring, by the load balancing device, network packet flow in transmit ports of the load balancing device the load balancing device configured to control distribution of the network packet flow in accordance with a plurality of rules;
detecting, by the load balancing device, unintended dropped network packets in the network packet flow;
creating, by the load balancing device, a 5-tuple for the unintended dropped network packets;
transmitting, by the load balancing device, the 5-tuple and a sample of the network packet flow to a flow processing analysis device for performing load balancing flow processing;
determining, by the flow processing analysis device, using machine learning techniques, reconfiguration load balancing settings for the load balancing device based on an analysis of the 5-tuple and the sample of the network packet flow;
adjusting, by the flow processing analysis device, one or more rules of the plurality of rules that caused the unintended dropped network packets based on the reconfiguration load balancing settings for the load balancing device;
transmitting, by the flow processing analysis device, the one or more adjusted rules to the load balancing device for subsequent implementation by the load balancing device while processing second network packet flow; and
changing, by the load balancing device, one or more load balancing settings pursuant to the reconfiguration load balancing settings.

18. A system for dynamic load balancing, the system comprising:
a load balancing device configured to:
monitor network packet flow in transmit ports of the load balancing device;
control distribution of the network packet flow in accordance with a plurality of rules;
detect unintended dropped network packets in the network packet flow;
create metadata for the unintended dropped network packets; and
transmit the metadata to a flow processing analysis device for performing load balancing flow processing; and
the flow processing analysis device configured to:
determine reconfiguration load balancing settings for the load balancing device based on an analysis of the metadata received from the load balancing device;
adjust one or more rules of the plurality of rules that caused the unintended dropped network packets based on the reconfiguration load balancing settings for the load balancing device;
transmit the one or more adjusted rules and the reconfiguration load balancing settings to the load balancing device for subsequent implementation by the load balancing device while processing second network packet flow; and
cause the load balancing device to change one or more load balancing settings pursuant to the reconfiguration load balancing settings.

* * * * *